(12) United States Patent
Staal et al.

(10) Patent No.: US 12,005,988 B1
(45) Date of Patent: Jun. 11, 2024

(54) RECONFIGURABLE COMPACT ELECTRIC TRANSPORT DEVICE

(71) Applicant: Honda Motor Co., Ltd., Tokyo (JP)

(72) Inventors: Matthew B. Staal, Torrance, CA (US); Jackie P. Porchay, Torrance, CA (US); Michael J. Kim, Long Beach, CA (US); Ming Hsein Lee, Taichung (TW); Ding Jong Chou, Taichung (TW); Sheng Yu Huang, Taichung (TW)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 18/193,734

(22) Filed: Mar. 31, 2023

Related U.S. Application Data (63) Continuation of application No. 17/215,425, filed on Mar. 29, 2021, now abandoned.

(51) Int. Cl.
*B62K 15/00* (2006.01)
*B62K 11/14* (2006.01)

(52) U.S. Cl.
CPC ............ *B62K 15/008* (2013.01); *B62K 11/14* (2013.01); *B62K 2202/00* (2013.01)

(58) Field of Classification Search
CPC .................................................. B62K 2202/00
USPC ......................................................... 180/218
See application file for complete search history.

(56) References Cited

U.S. PATENT DOCUMENTS

| | | | |
|---|---|---|---|
| 3,314,494 A | 4/1967 | Weitzner | |
| 3,316,993 A | 5/1967 | Weitzner | |
| 4,913,252 A | 4/1990 | Bartley et al. | |
| 6,272,442 B1 | 8/2001 | Jeffries | |
| 6,460,866 B1 | 10/2002 | Altschul et al. | |
| 6,688,614 B2 | 2/2004 | Hsu | |
| 8,534,405 B2 | 9/2013 | Kim et al. | |
| 9,033,350 B2 | 5/2015 | Porri | |
| 9,422,022 B2 | 8/2016 | Sharkan et al. | |
| 9,629,430 B1 * | 4/2017 | Getahun | A45C 5/03 |
| 9,896,148 B2 | 2/2018 | Baba | |
| 10,328,988 B2 | 6/2019 | Bang et al. | |
| 10,568,402 B2 * | 2/2020 | Kim | A45C 9/00 |
| 11,124,257 B2 | 9/2021 | Kuo et al. | |

(Continued)

FOREIGN PATENT DOCUMENTS

| | | |
|---|---|---|
| CN | 201023294 Y | 2/2008 |
| CN | 201023591 Y | 2/2008 |

(Continued)

*Primary Examiner* — Minnah L Seoh
*Assistant Examiner* — Hosam Shabara
(74) *Attorney, Agent, or Firm* — Stinson LLP (57) ABSTRACT

An electric transport device included an outer casing including a top, a bottom, a front, a back, and an interior space. A rear wheel assembly is mounted to the outer casing. The rear wheel assembly extends rearward of the back of the outer casing when the electric transport device is in a riding configuration. A locking mechanism is configurable in a first configuration to engage the rear wheel assembly to lock the rear wheel assembly in a riding position. The locking mechanism is configurable in a second configuration to disengage the locking mechanism from the rear wheel assembly permitting the rear wheel assembly to be moved relative to the outer casing to move the rear wheel assembly from the riding position to a stowed position.

17 Claims, 14 Drawing Sheets

(56) References Cited

U.S. PATENT DOCUMENTS

| | | | |
|---|---|---|---|
| 2004/0094919 A1 | | 5/2004 | Roder et al. |
| 2013/0306392 A1 | | 11/2013 | Schaap |
| 2016/0144708 A1 | | 5/2016 | Lee |
| 2023/0074978 A1 * | | 3/2023 | Kim ....................... B62K 21/24 |

FOREIGN PATENT DOCUMENTS

| | | | |
|---|---|---|---|
| CN | 201291966 Y | | 8/2008 |
| CN | 201154754 Y | | 11/2008 |
| CN | 201186711 Y | | 1/2009 |
| CN | 201291969 Y | | 9/2009 |
| CN | 201506429 Y | | 6/2010 |
| CN | 102152831 A | | 8/2011 |
| CN | 202464044 U | | 10/2012 |
| CN | 202464044 U | * | 10/2012 |
| CN | 103770876 A | | 5/2014 |
| CN | 204161572 U | | 2/2015 |
| CN | 205168762 U | | 4/2016 |
| CN | 106005187 A | | 10/2016 |
| CN | 108657349 A | | 10/2018 |
| WO | 2010094824 A1 | | 8/2010 |
| WO | 2012152069 A1 | | 11/2012 |

* cited by examiner

RECONFIGURABLE COMPACT ELECTRIC TRANSPORT DEVICE

CROSS-REFERENCE TO RELATED APPLICATION

This application is a continuation of U.S. application Ser. No. 17/215,425, filed Mar. 29, 2021, which is hereby incorporated by reference in its entirety.

FIELD

The present disclosure relates to a compact transport device and more particularly to a compact transport device having a stowable rear wheel assembly.

BACKGROUND

With rising prices of gasoline and automobiles, many people may turn to other more cost efficient modes of transportation such as, for example, mopeds, bicycles, scooters, and more recently, electric personal transport devices, such as electric scooters. These electric transport devices may be particularly popular for shorter trips in a city environment due to their compact size, ease of use, mobility, and the fact that they may be reconfigured into a more compact configuration as needed for ease of portability. They may also be useful for covering the first mile or last mile of a trip which is the link between a user's origin or destination and another transportation means, hub or mass transit network. One existing barrier to widespread use of electric transport devices is the time needed to set up and collapse the devices before and after their use.

SUMMARY

In one aspect, an electric transport device generally comprises an outer casing including a top, a bottom, a front, a back, and an interior space. A rear wheel assembly is mounted to the outer casing. The rear wheel assembly extends rearward of the back of the outer casing when the electric transport device is in a riding configuration. A locking mechanism is configurable in a first configuration to engage the rear wheel assembly to lock the rear wheel assembly in a riding position. The locking mechanism is configurable in a second configuration to disengage the locking mechanism from the rear wheel assembly permitting the rear wheel assembly to be moved relative to the outer casing to move the rear wheel assembly from the riding position to a stowed position.

In another aspect, a locking mechanism for an electric transport device generally comprises a latch engaging a rear wheel assembly of the transport device to lock the rear wheel assembly in a riding positon. The locking mechanism is configurable in a first configuration to engage the rear wheel assembly to lock the rear wheel assembly in the riding position. The locking mechanism is configurable in a second configuration to disengage the locking mechanism from the rear wheel assembly permitting the rear wheel assembly to be moved relative to an outer casing of the transport device to move the rear wheel assembly from the riding position to a stowed position.

In yet another aspect, a method of transitioning a rear wheel assembly of an electric transport device from a riding position to a stowed position generally comprises operating a locking mechanism to disengage the locking mechanism from the rear wheel assembly when the rear wheel assembly is in the riding positon such that the rear wheel assembly extends rearward of a back of an outer casing of the electric transport device. The method further comprises moving the rear wheel assembly relative to the outer casing from the riding position to the stowed position whereby a rear wheel of the rear wheel assembly is at least partially housed in an interior space of the outer casing of the transport device.

BRIEF DESCRIPTION OF THE DRAWINGS

Corresponding reference characters indicate corresponding parts throughout the drawings.

DETAILED DESCRIPTION

Embodiments of electric transport devices having one or more components that are reconfigurable between a riding configuration and a stowed configuration are described herein. The techniques described in connection with the present embodiments may be used to provide an electric transport device having a convenient, locking mechanism that allows a user to quickly lock the one or more components of the device in a riding position and unlock the one or more components in the riding position for moving the component to a stowed position. Additionally, the electric transport devices may have a compact configuration that allows a user to carry the device by hand and store the device in a primary vehicle, on public transportation, an/or on other forms of transportation to be used for "last-mile" or "first-mile" trips to and from a destination.

The example embodiments are described herein with reference to an electric transport device in the form of an electric scooter. As used herein, an electric scooter is a term used mainly to describe a scooter that is electrically powered. However, the principles of the example embodiments described herein may be applied to electric scooters or other types of electric transport devices, such as bicycles, unicycles, mopeds, skateboards, kickboards, wheelchairs, personal transporters, or the like.

Figure 1:
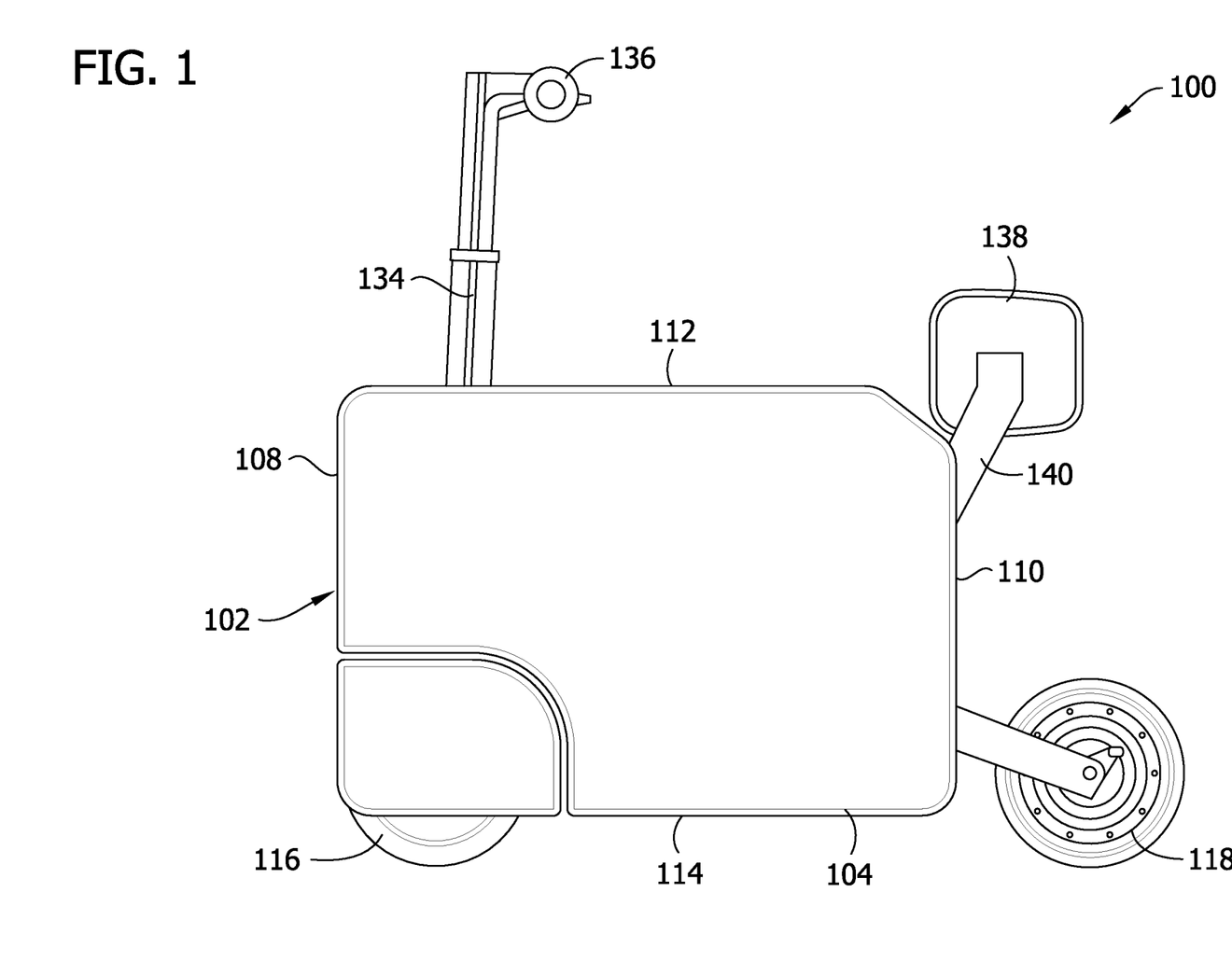
FIG. 1 is an elevation of an electric transport device of the present disclosure.
Figure 2:
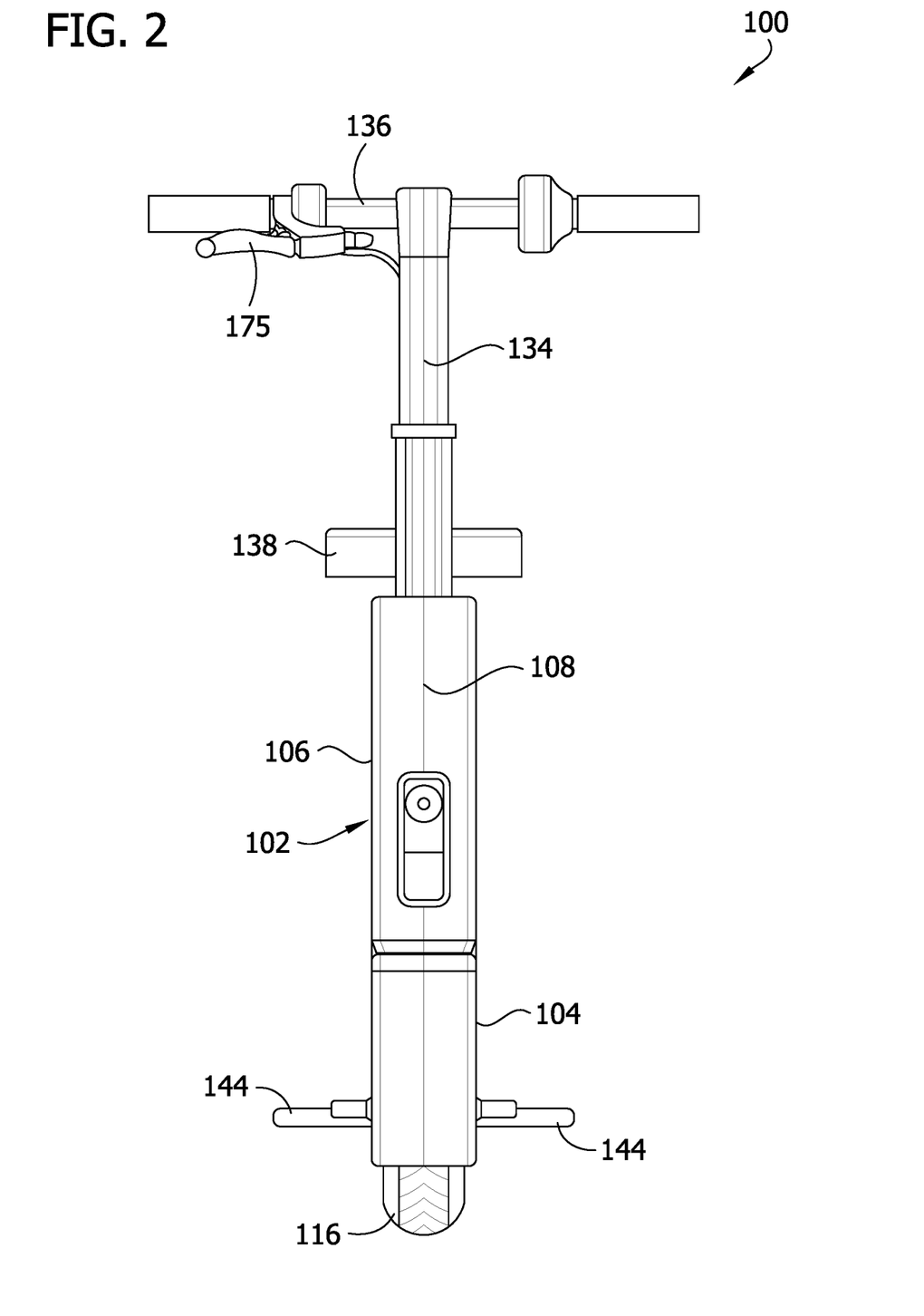
FIG. 2 is a front view of the electric transport device.
Figure 3:
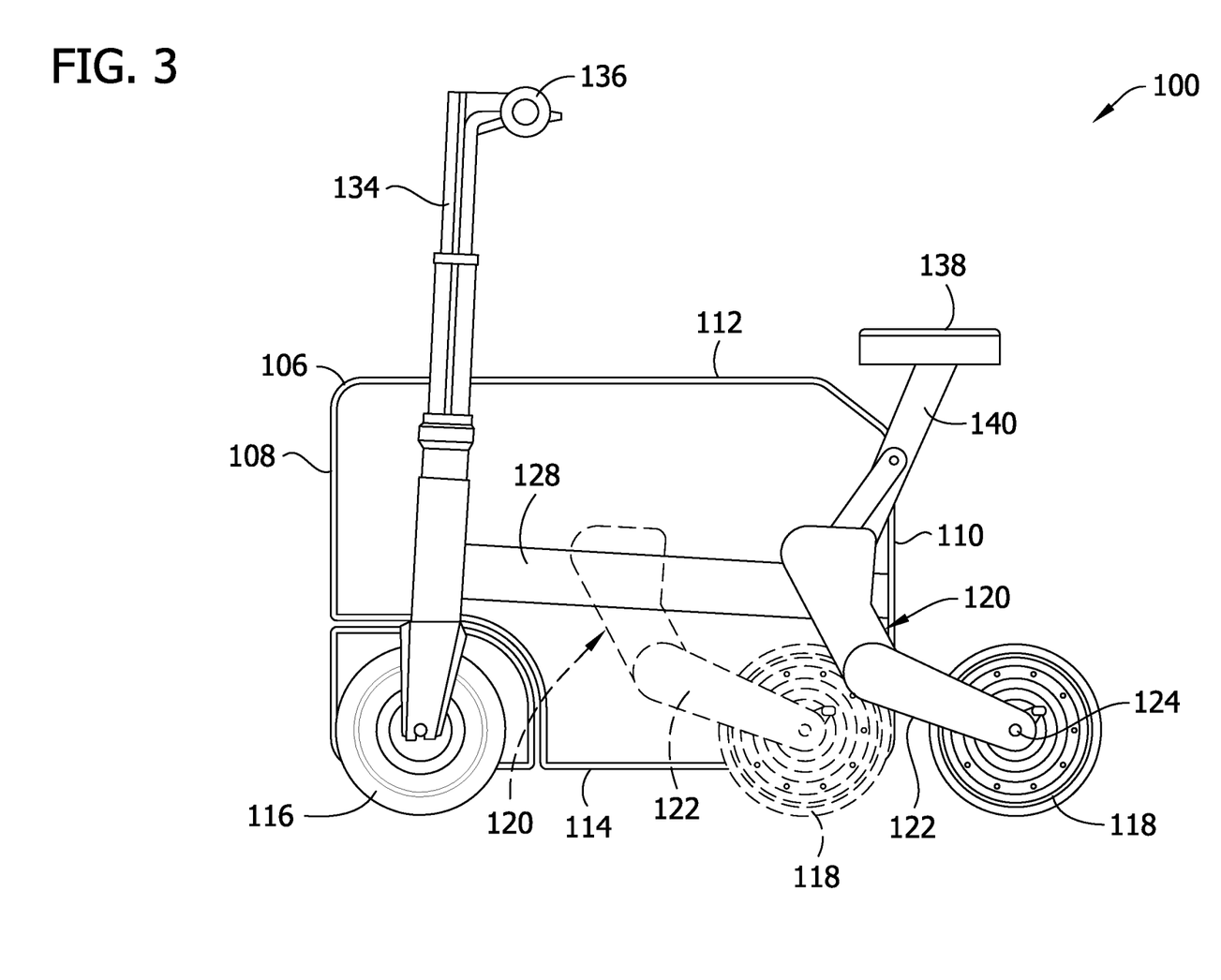
FIG. 3 is an elevation of the electric transport device with a casing component removed and illustrating a rear wheel in a deployed and stowed position.

Referring to FIGS. 1-3, the present disclosure is directed to an electric transport device (e.g., scooter) generally indicated at 100. The scooter includes an outer casing 102 having a generally rectangular shape. In one embodiment, the casing 102 comprises first and second casing members 104, 106 each defining flat exterior sides having a length extending from a front 108 to a back 110 of the casing that is longer than a height of the casing extending from a bottom 114 to a top 112 of the casing. In addition, the electric scooter 100 may have a width extending between the flat sides of the casing members 104, 106 that is substantially smaller than the length and/or height of the casing 102.

In one embodiment, the length of electric scooter 100 is approximately 26 inches, the height of electric scooter 100 (from the bottom 114 to the top 112 of the casing 102) is approximately 20 inches, and the width of electric scooter 100 is approximately 3 inches. It should be understood that these measurements are exemplary and the dimensions of electric scooter 100 may vary to be larger or smaller. Additionally, in one embodiment, electric scooter 100 has a weight of approximately 25-27 pounds. In other embodiments, the weight of electric scooter 100 may be larger or smaller. With this arrangement, the electric scooter 100 is configured to have a size and weight that allows electric scooter 100 to be easily and conveniently transported by a user in the stowed configuration. Further, the outer casing 102 may be made of an impact resistant plastic or polymer. However, other materials for the casing 102 are envisioned. As will be explained in greater detail below, the electric scooter 100 may be transitioned between a riding configuration in which one or more components of the electric scooter are in extended or deployed positions at least partially extending outside of the outer casing 102 so that the electric scooter may be operated or ridden by a user, and a stowed configuration in which one or more components of the electric scooter are moved or stored at least partially inside the outer casing.

Referring to FIG. 1, a front wheel 116 is visible from below the bottom 114 of the casing 102 near the front 108 of the casing. The electric scooter 100 also includes a rear wheel 118 that is shown disposed entirely outside outer casing 102 (i.e., in the riding configuration) extending past (i.e., rearward of) the back 110 of the casing. In an example embodiment, front wheel 116 of electric scooter 100 may be steerable while rear wheel 118 is not steerable. In one embodiment, front wheel 116 and rear wheel 118 are the same size and have a diameter of approximately 8 inches. In other embodiments, front wheel 116 and rear wheel 118 may be larger or smaller. In addition, in some cases, front wheel 116 and rear wheel 118 may be different sizes (e.g., front wheel 116 may be larger than rear wheel 118 or rear wheel 118 may be larger than front wheel 116). Still other configurations of the front and rear wheels 116, 118 are envisioned.

Referring to FIG. 3, a rear fork 120 couples the rear wheel 118 to the casing 102. The rear fork 120 comprises a pair of arms 122 extending from inside the casing 102 to the rear wheel 118. The arms 122 are mounted in the casing 102 at a first end portion of the arms, and attached to an axel 124 of the rear wheel 118 at a second end portion of the arms. The arms 122 are movably mounted in the casing 102 to allow the rear wheel 118 to be slid relative to the casing between the extended and stowed position. In particular, connecting pins 126 (FIGS. 7A-8C) extend between the first end portions of the arms 122 and connect the arms together at their first end portions. A rail 128 is disposed in the casing 102 and extends generally horizontally between the front 108 and back 110 of the casing. First connecting pins 126A engage a top horizontal surface 130 of the rail 128, and a second connecting pin 126B engages a bottom horizontal surface 132 of the rail. As such, the connecting pins 126A, 126B are configured to slide along the top and bottom surfaces 130, 132, respectively, causing the arms 122 to move (i.e., translate horizontally) relative to the casing 102. Therefore, the rail 128 guides the movement of the arms 122 relative to the casing 102. The movement of the arms 122 thus causes the rear wheel 118 to also move relative to the casing 102 with the arms. In the illustrated embodiment, the rail 128 comprises a single channel member. However, the rail 128 could be formed from multiple components without departing from the scope of the disclosure. For example, a pair of elongate plates could be mounted in the casing 102 in the locations of the top and bottom surfaces 130, 132 for engaging the pins 126A, 126B to guide the movement of the arms 122. Still other methods for guiding movement of the fork 120 are also envisioned. The rear fork 120 and rear wheel 118 may be broadly considered, a rear wheel assembly. The rear wheel assembly may include the rear wheel 118 and any structure coupling the rear wheel to the casing 102 and moving conjointly with the rear wheel.

The electric scooter 100 may include a battery (not shown) that provides an electrical charge to a power source, such as a motor (not shown), that drives one or more of the wheels of electric scooter 100, including front wheel 116 and/or rear wheel 118. The electric motor may be configured to drive a single wheel (e.g., one of front wheel 116 or rear wheel 118) or both wheels (e.g., front wheel 116 and rear wheel 118) of electric scooter 100. In still other cases, each wheel (e.g., front wheel 116 and rear wheel 118) may be provided with an independent electric motor to drive its respective wheel of electric scooter 100.

Referring to FIGS. 1-3, the electric scooter 100 includes a steering column 134 extending upwards from the casing 102 when the scooter is in the riding configuration. A handlebar 136 is attached to the steering column 134 and extends laterally from the steering column. In the illustrated embodiment, handlebar 136 extends in a substantially horizontal orientation so that handlebar is approximately perpendicular to steering column 134. The handlebar 136 and steering column 134 are configured to allow a user to control an orientation of front wheel 116 to steer electric scooter 100 in the riding configuration. A seat 138 is mounted on a seat post 140 that extends from an interior of the casing 102 to an exterior of the casing so that a user can sit on the seat to ride the scooter 100 when the scooter is in the riding configuration. In the illustrated embodiment, a third connecting pin 126C attaches the seat post 140 to the rear fork 120. Additionally, foot pedals 144 (FIG. 2) may extend out from opposite sides of the casing 102 through the casing members 104, 106 so that a user may place their feet on the foot pedals on both sides of electric scooter 100. With this arrangement, the foot pedals 144 allow a user to rest their feet above the ground surface while riding electric scooter 100.

Figure 4:
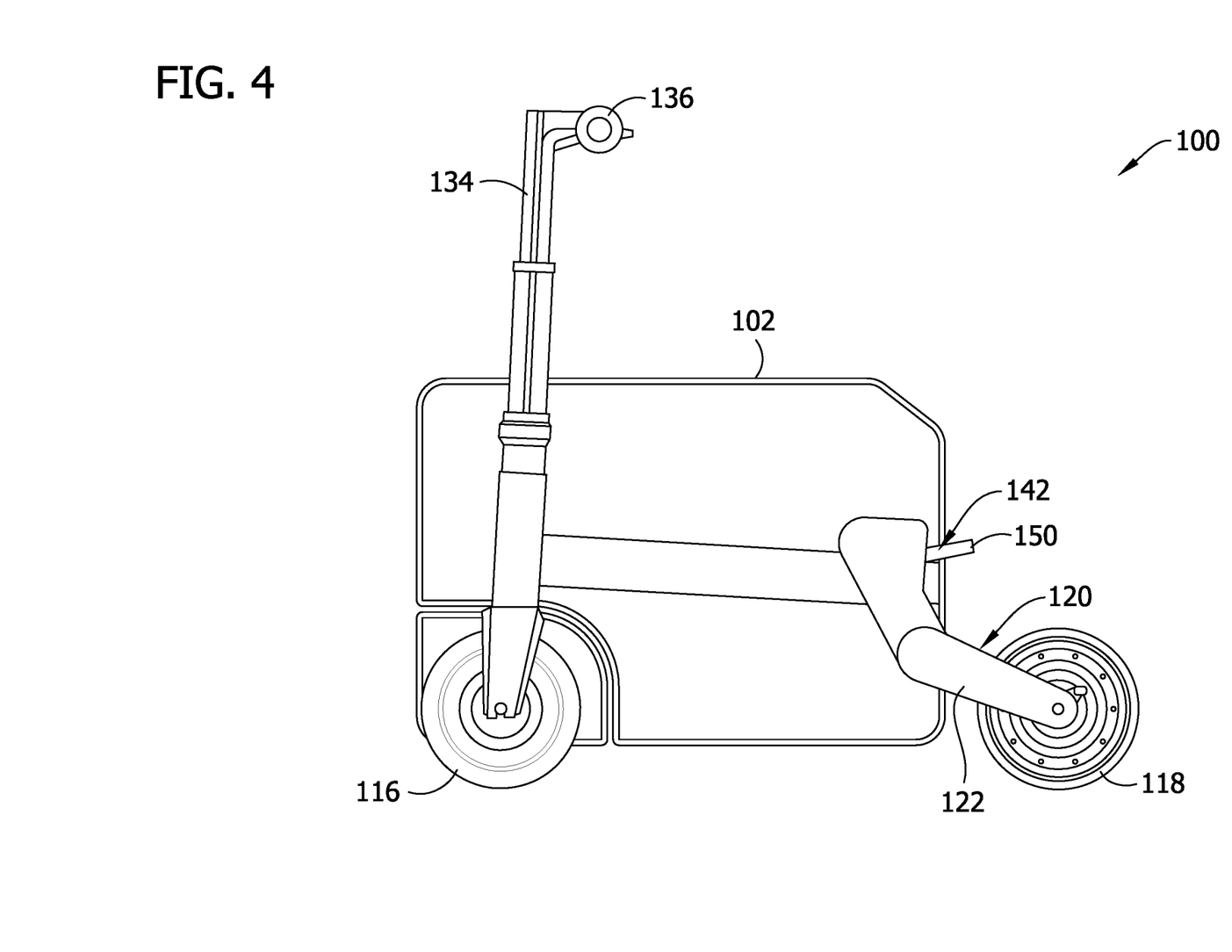
FIG. 4 is an elevation of the electric transport device with the casing component and a seat of the device removed and illustrating the rear wheel in the deployed position.
Figure 5:
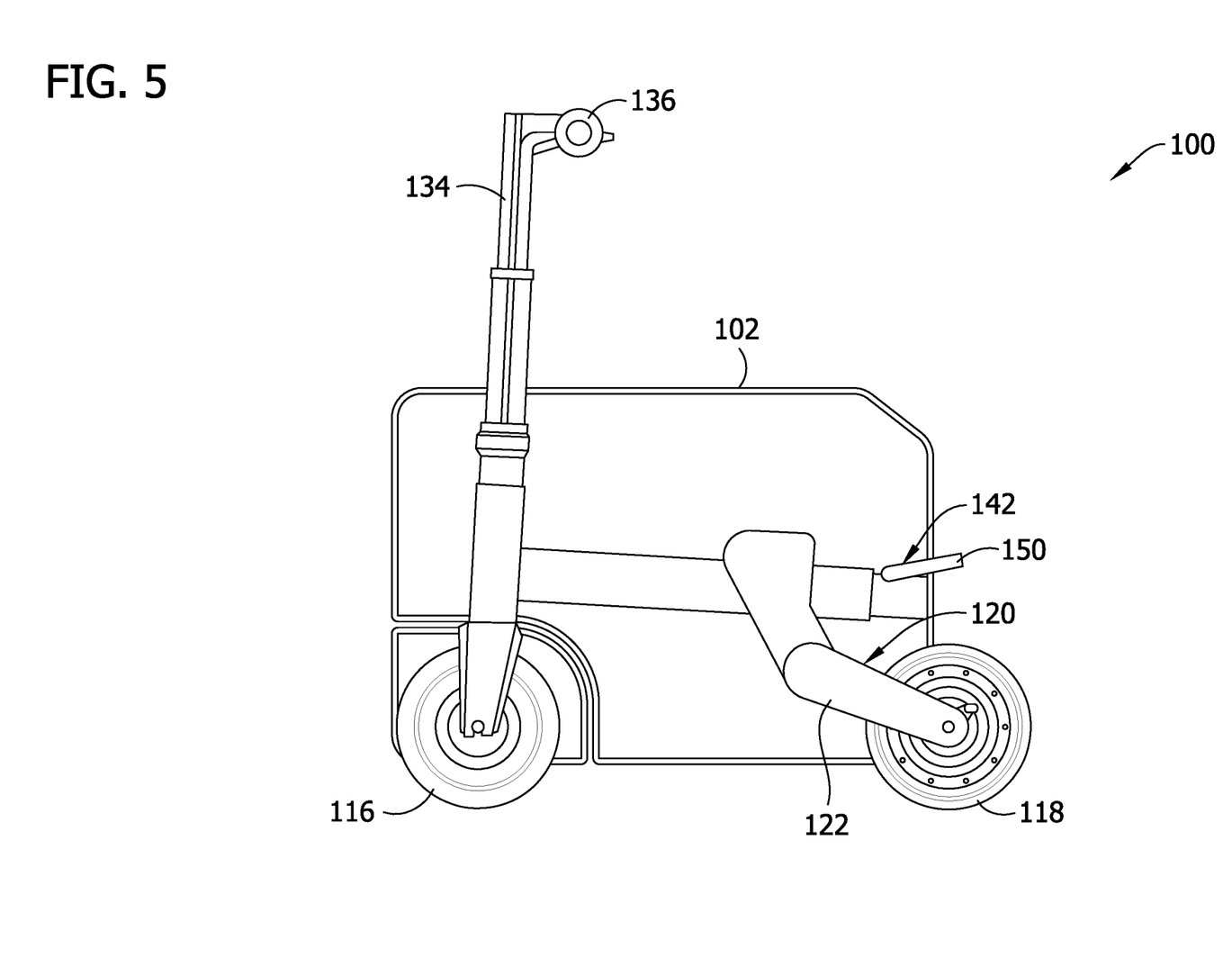
FIG. 5 is an elevation of the electric transport device with the casing component and seat removed and illustrating the rear wheel moved to an intermediate position.
Figure 6:
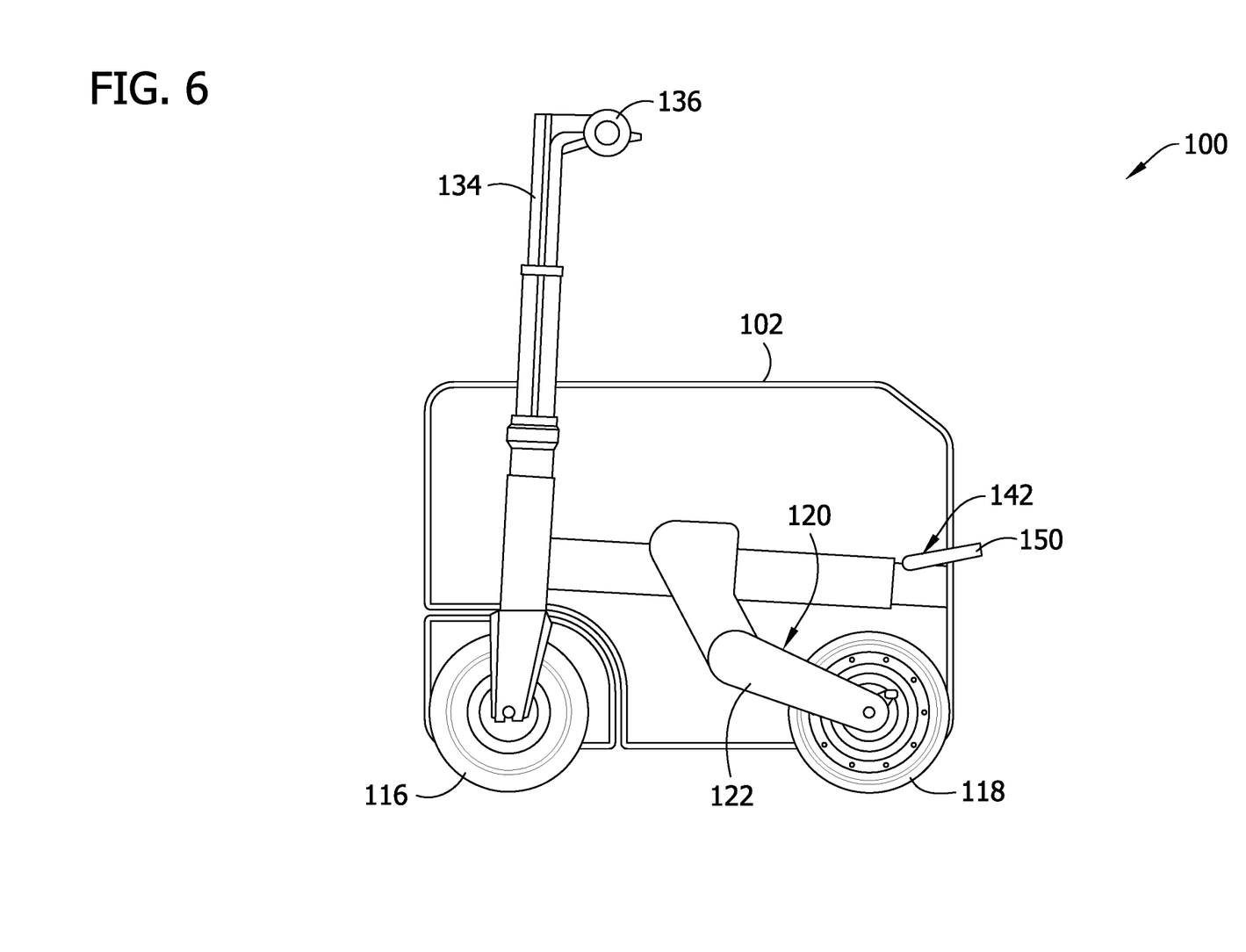
FIG. 6 is an elevation of the electric transport device with the casing component and seat removed and illustrating the rear wheel in the stowed position.

Referring to FIGS. 4-6, a locking mechanism 142 is provided on the electric scooter 100 and allows a user to quickly lock and unlock the scooter in the riding configuration. Thus, in the unlocked state, the user is free to reconfigure the scoter 100 from the riding configuration (as shown in FIGS. 1 and 4) to the stowed configuration (FIG. 6). In particular, unlocking the locking mechanism 142 allows a user to easily move the rear wheel 118 from a riding position to a stowed position. Similarly, the user can lock or relock the rear wheel 118 in the riding positon after the wheel has been moved from the stowed position to the riding position. The locking mechanism 142 ensures that the rear wheel 118 will remain in the riding positon when the scooter 100 is configured in the riding configuration. Therefore, the locking mechanism 142 provides an added safety feature during use of the scooter 100.

Figure 7A:
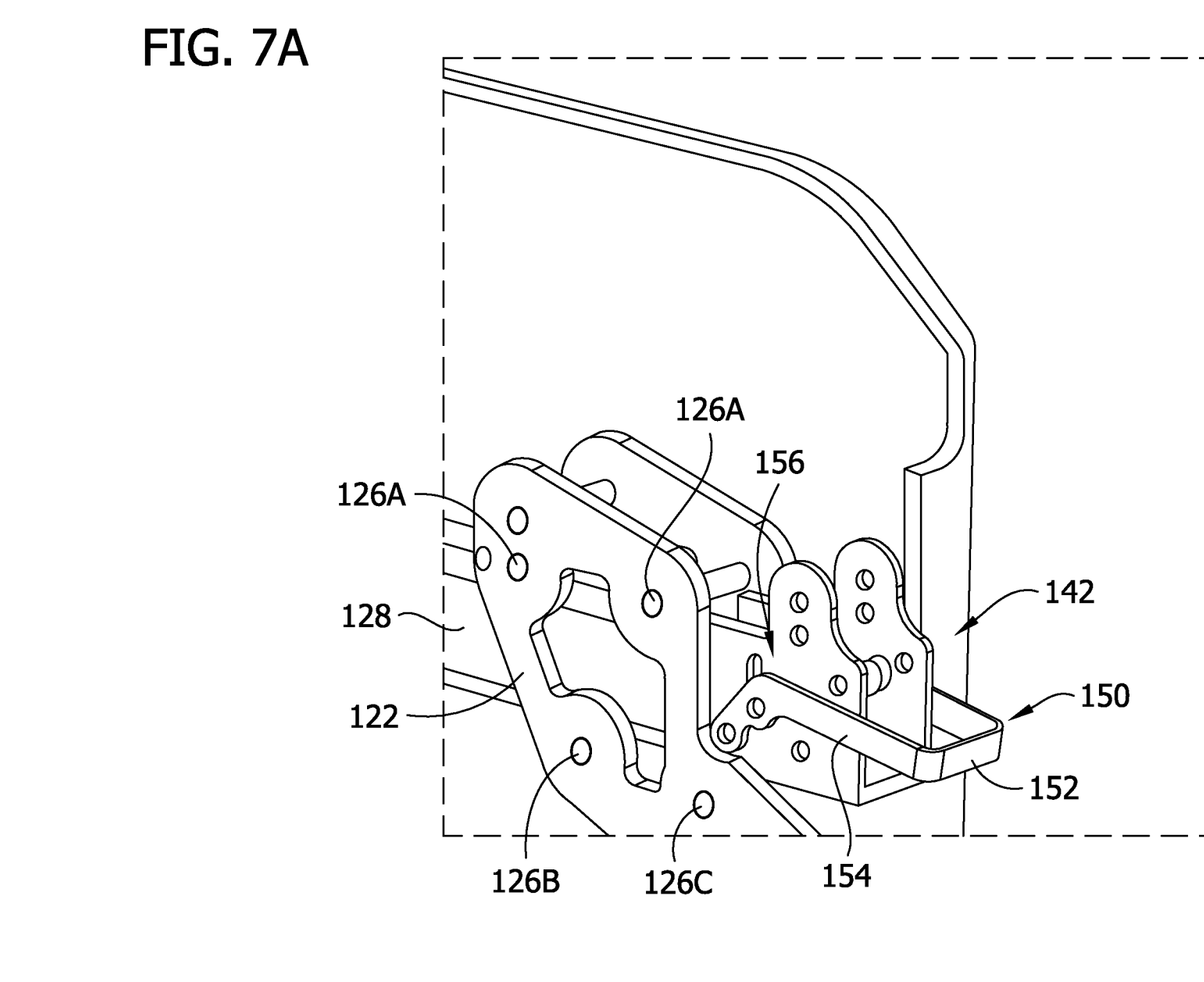
FIG. 7A is a fragmentary perspective of the electric transport device in a riding configuration and with the casing and seat removed illustrating internal detail.
Figure 7B:
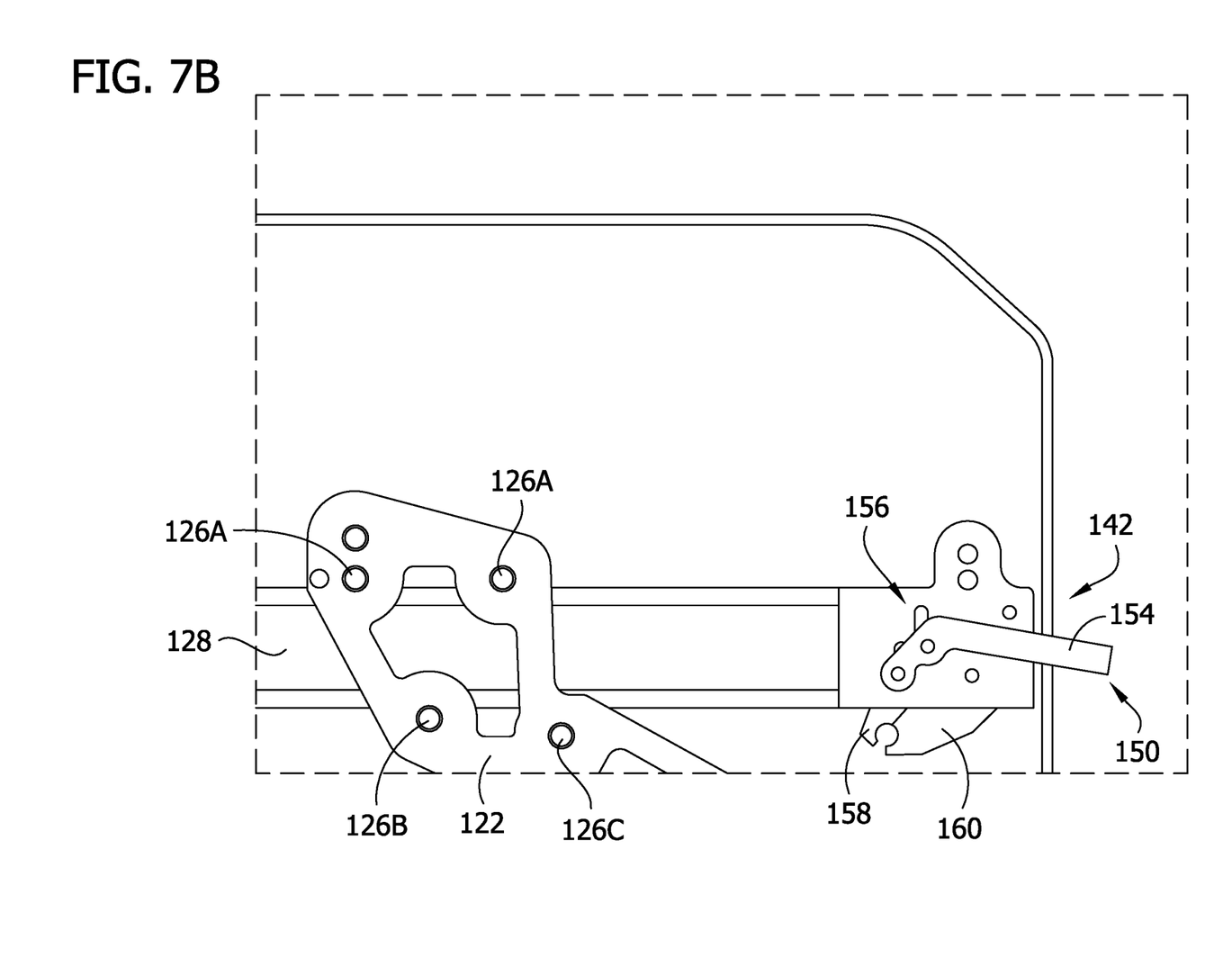
FIG. 7B is an elevation of the electric transport device in a partially stowed configuration and with the casing and seat removed illustrating internal detail.

Referring to FIGS. 7A-8C, the locking mechanism comprises a lever 150 pivotally mounted in the casing 102 and movable between a first, locked position (FIG. 7A) and a second, unlocked position (FIG. 7B). The lever 150 includes a tab or bar 152 extending laterally from arms 154. The tab 152 is configured to be grasped by a user to move the lever 150 between the first and second positions. The arms 154 extends from the tab 152 at first ends of the arm and connect to a linkage 156 at opposite ends of the arm. The linkage 156 connects the lever 150 to a latch 158 such that movement of the lever causes movement of the latch. In particular, a pivoting movement of the lever 150 from the first position up to the second position causes the latch 158 to pivot upwards disengaging the latch from a fourth connecting pin 126D of the fork 120 seated on a stop 160 in the casing 102. The pivoting of the latch 158 moves the latch out of the way of the fourth connecting pin 126D allowing the first and second connecting pins 126A, 126B of the fork 120 to slide along the rail 128 to move the rear wheel 118 from the riding position to the stowed position. In the illustrated embodiment, the latch 158 and stop 160 have curved surfaces configured to receive a portion of the curvature of the fourth connecting pin 126D when the rear wheel 118 is in the riding position and the locking mechanism 142 is in the locked configuration such that the latch engages the fourth connecting pin blocking movement of the locking pin away from the stop. It will be understood that the locking mechanism 142 may engage the fork 120 by other means without departing from the scope of the disclosure.

Figure 9A:
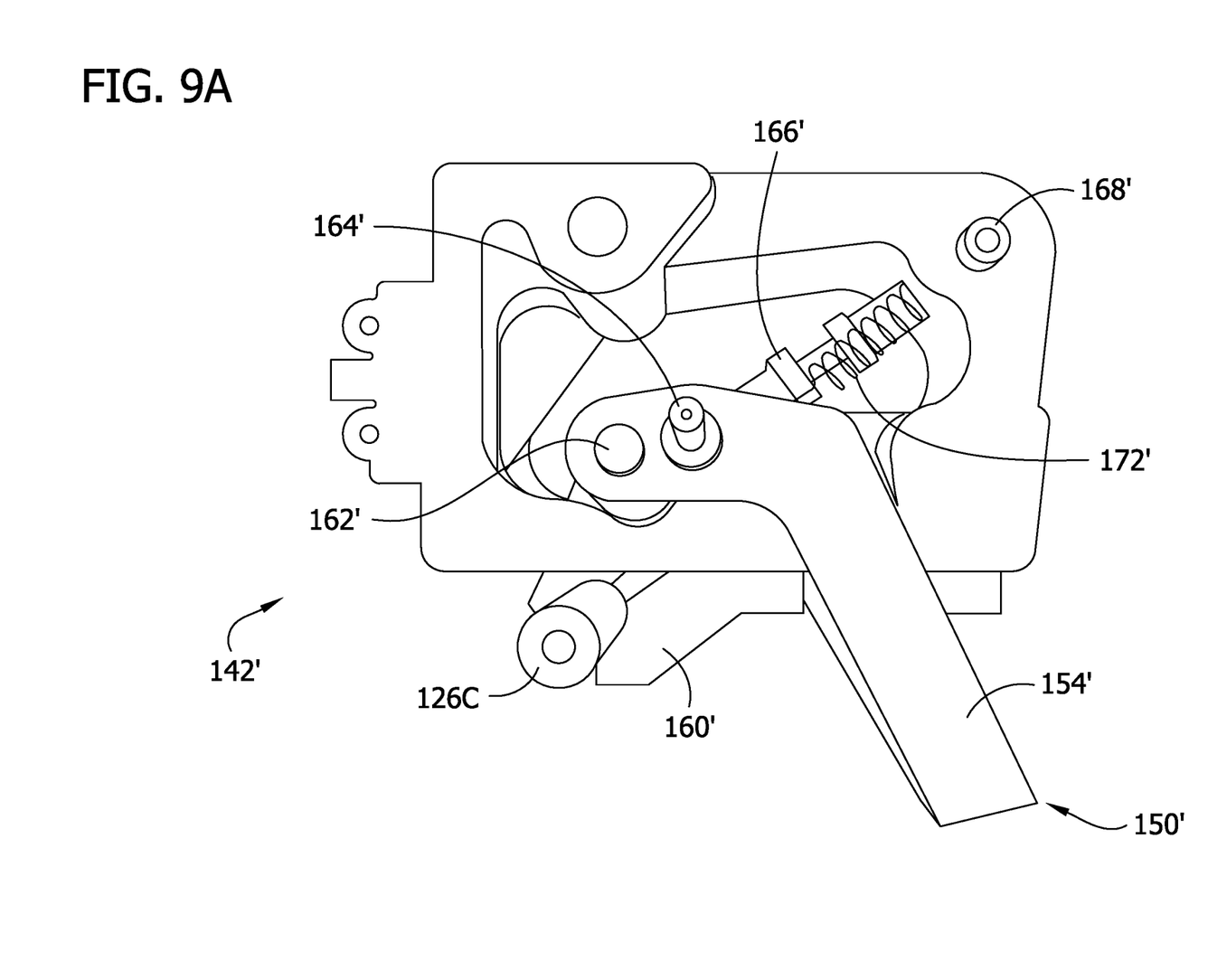
FIGS. 9A and 9B are illustrations of a latching mechanism of another embodiment.
Figure 9B:
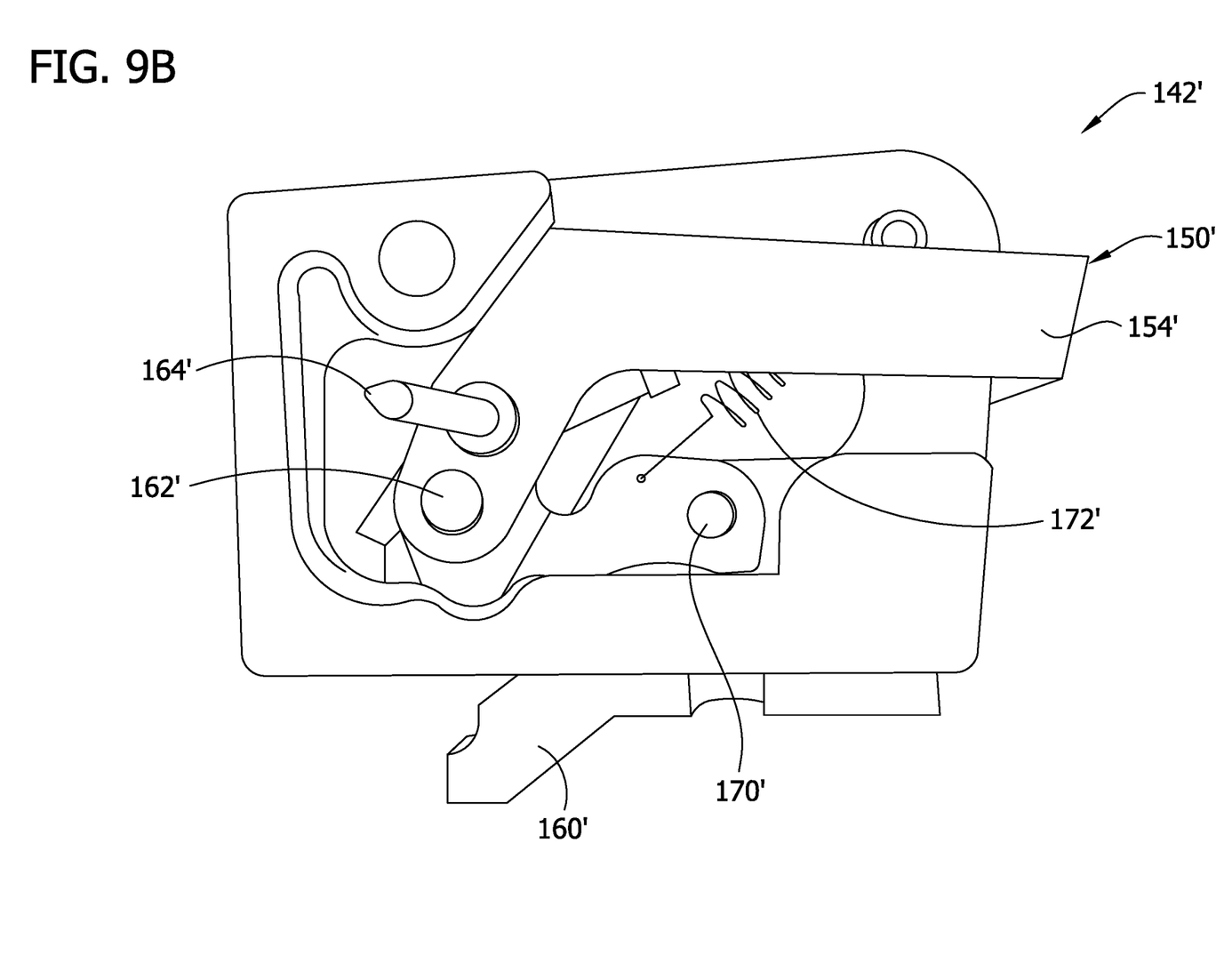

Referring to FIGS. 9A and 9B, a locking mechanism of another embodiment is generally indicated at 142'. The locking mechanism 142' is similar to locking mechanism 142 and comprises a lever 150' including arms 154' pivotally mountable in the casing 102 about an axis extending through at a first pivot point 162'. A rod 164' extends through the arms 154' at a location spaced apart from the first pivot point 162'. The rod 164' extends generally parallel to the pivot axis through the first pivot point 162'. The rod 164' connects to a damper 166' at a first end of the damper. The damper 166' is pivotally mounted in the casing 102 at a second end of the damper about an axis extending through a second pivot point 168'. The damper 166' is configured to lengthen as the damper is placed under tension, and shorten back to its original state when the tension force is removed.

A latch 158' is pivotally mounted in the casing about an axis extending through a third pivot point 170'. The third pivot point 170' is located generally at a first end margin of the latch 158'. A spring (broadly, a linkage arm) 172' extends between the second pivot point 168' and a location on the latch 158' spaced apart from the third pivot point 170'. In the illustrated embodiment, the spring 172' attaches to the latch 158 at a position intermediate the third pivot point 170' and a second end margin of the latch opposite the first end margin. The rod 164' also extend through the latch 158' at a location intermediate the second end margin of the latch and the position at which the spring 172' attaches to the latch. Therefore, the rod 164' operatively connects the lever 150', damper 166', and latch 158' such that movement of the lever causes movement of the damper and latch. In particular, the pivoting movement of the lever 150' about the first pivot point 162' from the first position (FIG. 9A) to the second position (FIG. 9B) causes the causes the rod 164' to travel along an arc about the first pivot point. The movement of the rod 164' in turn causes the damper 166' to lengthen and pivot about the second pivot point 168'. Further because the rod 164' extends through the latch 158' at a location spaced from the third pivot point 170', the latch will in turn pivot about the third pivot point under the guide of the movement of the rod. The pivoting of the latch 158' will cause the latch to pivot away from the fourth connecting pin 126D seated on the stop 160'. The fourth connecting pin 126D will then be free to move away from the stop 160' so that the fork 120 can be slid along the rail 128 to move the rear wheel 118 from the riding position to the stowed position.

Figure 8A:
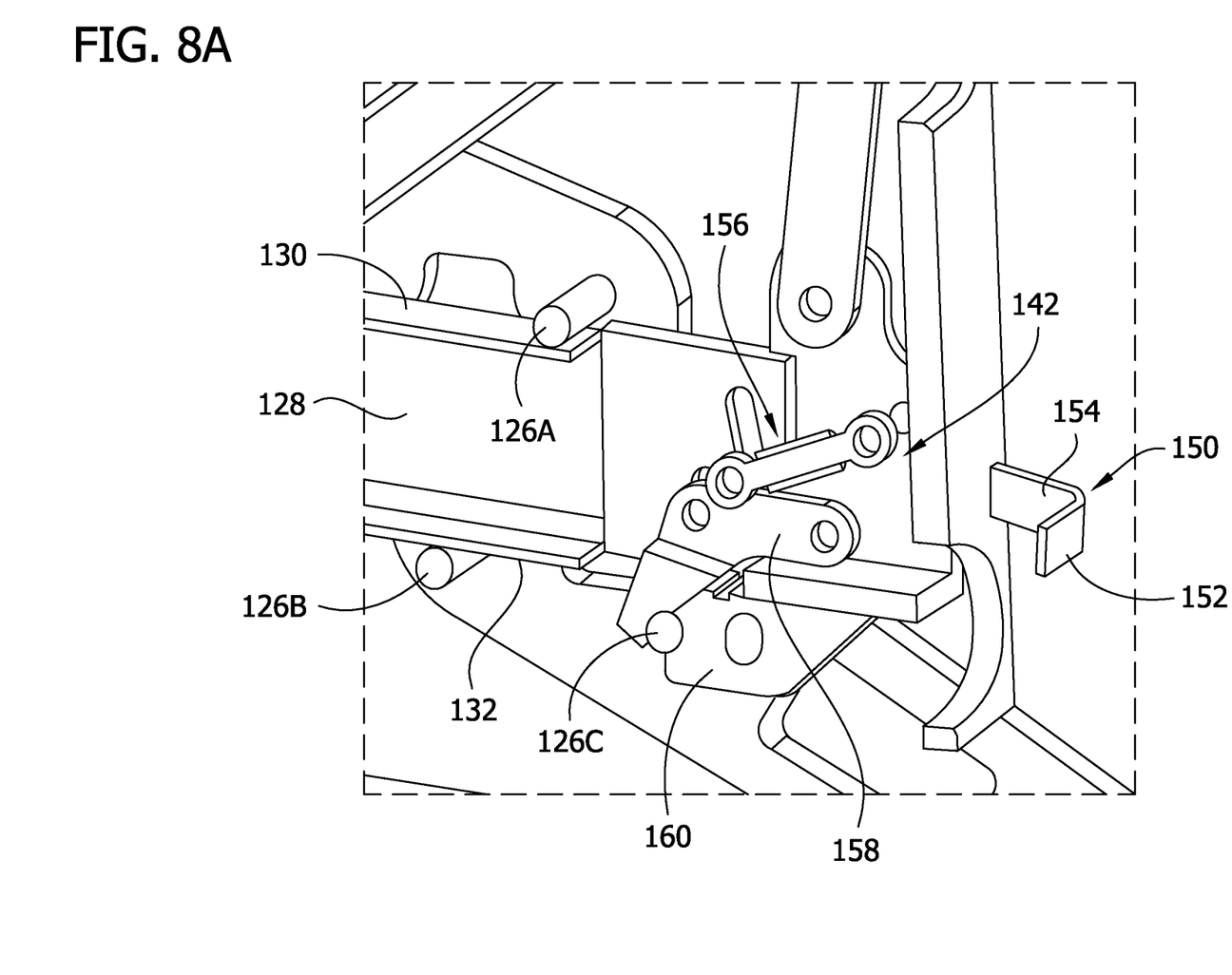
FIGS. 8A-8C are perspectives of a latching mechanism of the electric transport device.
Figure 8B:
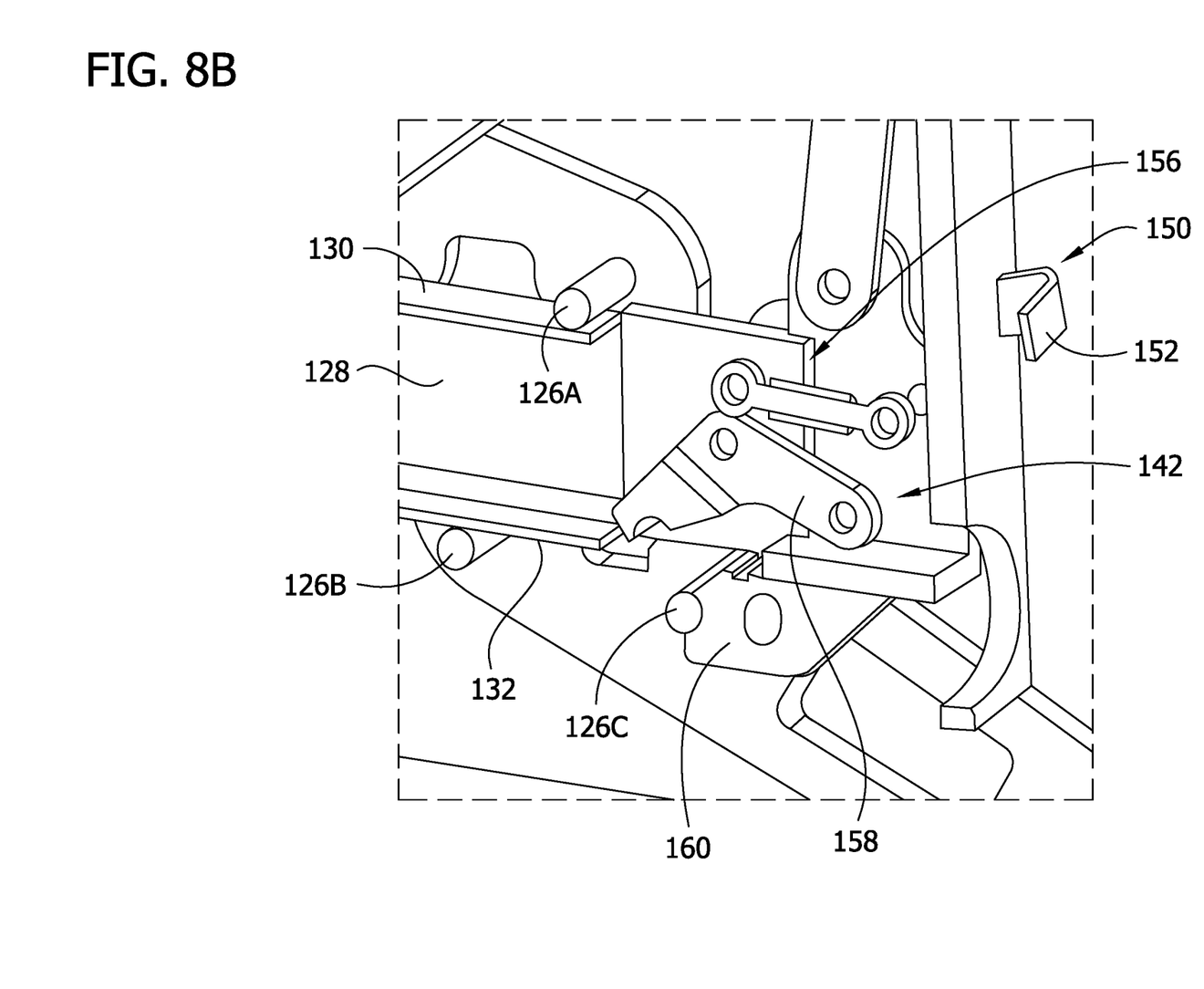
Figure 8C:
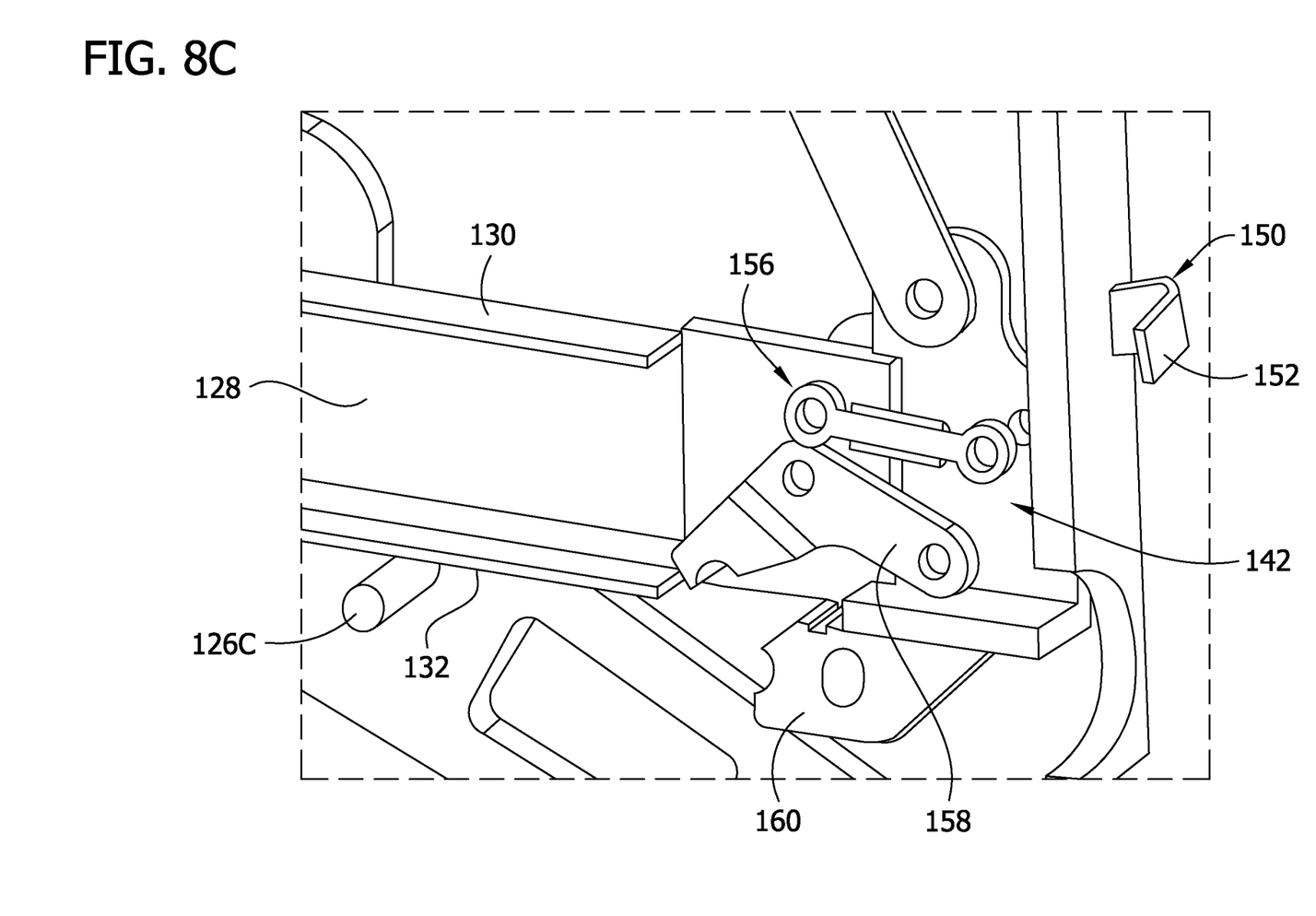
Figure 10:
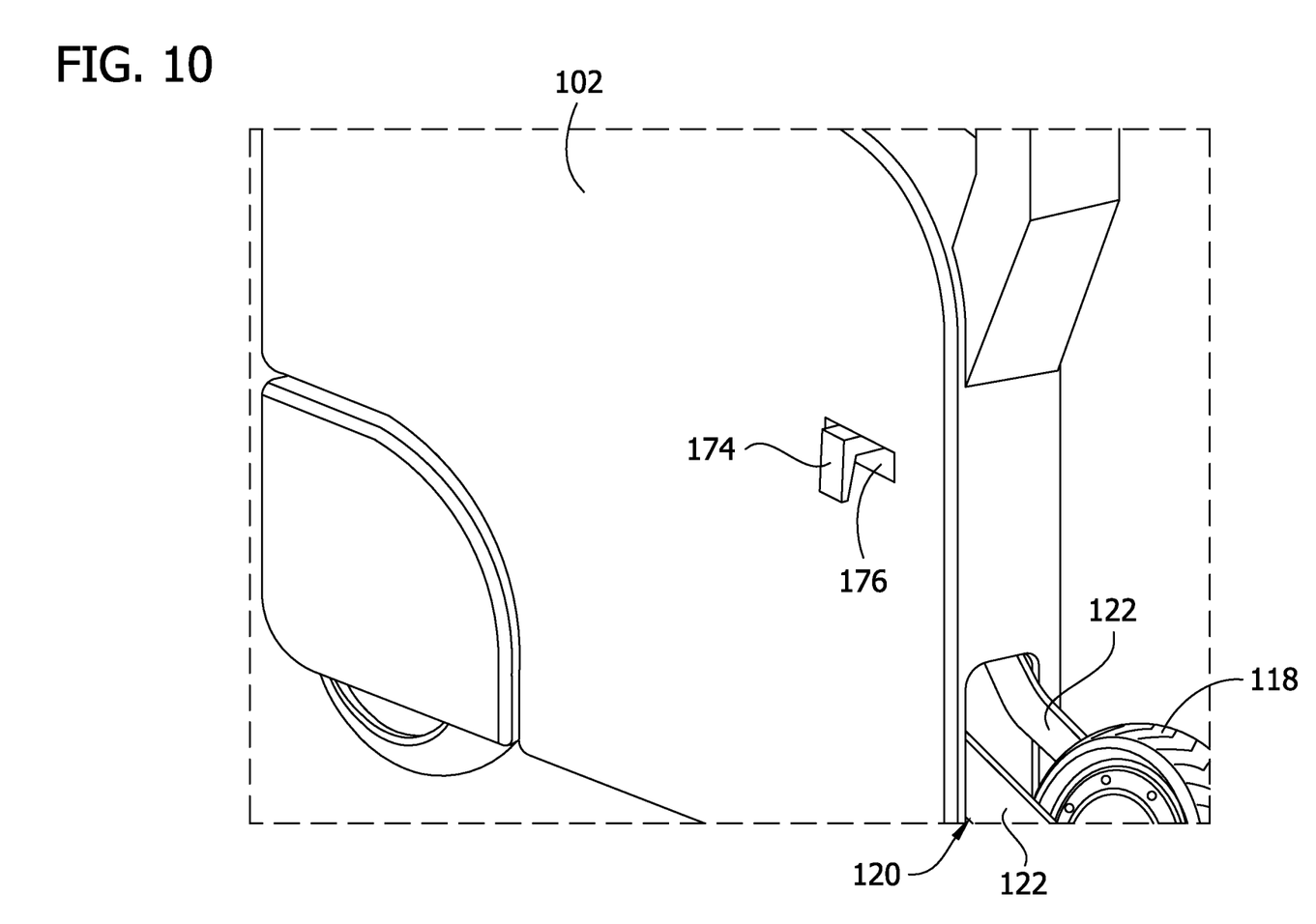
FIG. 10 is a fragmentary perspective of the electric transport device showing a handle of the device.

Accordingly, the process of moving the rear wheel 118 from the riding position to the stowed positon begins with moving the lever 150, 150' from the first position (FIGS. 8A and 9A) to the second position (FIGS. 8B and 9B). As explained above, this action causes the latch 158, 158' of the locking mechanism 142, 142' to move away from the fourth connecting pin 126D. The user may then slide or otherwise move the fork 120 and rear wheel 118 toward the front 108 of the casing 102 to place the rear wheel in the stowed position (FIG. 8C). In one embodiment, a user can then grasp a handle 174 (FIG. 10) attached to the fork 120 and extending through a slot 176 in the casing 102 to move the fork 120 and rear wheel 118 relative to the casing from the riding position to the stowed position to configure the scooter 100 from the riding configuration to the stowed configuration. Alternatively, a break lever 175 (FIG. 2) may be operatively attached to the fork 120 and operable to lock the rear wheel 118 against rotation. The casing 102 can then be moved rearward relative to the fork 120 and rear wheel 118 causing the fork to slide along the rail 128 to move the fork and rear wheel between the riding and stowed positions. In one embodiment, a user may hold on to the handle bar 136 and pull the casing 102 back casing the casing to slide over the fork 120 and rear wheel. It will be understood that the rear wheel 118 may be moved to the stowed positon by other means without departing from the scope of the disclosure.

Having described the disclosure in detail, it will be apparent that modifications and variations are possible without departing from the scope of the disclosure defined in the appended claims. When introducing elements of the present disclosure or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the disclosure are achieved and other advantageous results attained. As various changes could be made in the compositions without departing from the scope of the disclosure, it is intended that all matter contained in the above description shall be interpreted as illustrative and not in a limiting sense.

The invention claimed is:

1. An electric transport device comprising:
   an outer casing including a top, a bottom, a front, a back, and an interior space;
   a rear wheel assembly mounted to the outer casing, the rear wheel assembly extending rearward of the back of the outer casing when the electric transport device is in a riding configuration;
   a locking mechanism configurable in a first configuration to engage the rear wheel assembly to lock the rear wheel assembly in a riding position, and in a second configuration to disengage the locking mechanism from the rear wheel assembly permitting the rear wheel assembly to be moved relative to the outer casing to move the rear wheel assembly from the riding position to a stowed position; and a handle attached to the rear wheel assembly and extending to an exterior of the outer casing, the handle being configured to be grasped by a user to move the rear wheel assembly relative to the outer casing for moving the rear wheel assembly between the riding and stowed positions.

2. The electric transport device of claim 1, wherein the rear wheel assembly moves generally horizontally from the riding position to the stowed position.

3. The electric transport device of claim 1, further comprising a rail mounted in the interior space of the outer casing, the rail guiding movement of the rear wheel assembly between the riding and stowed positions.

4. The electric transport device of claim 3, wherein the rear wheel assembly include a fork mounted in the interior space of the outer casing and a rear wheel attached to the fork, and wherein the rear wheel is at least partially housed in the interior space of the outer casing in the stowed position.

5. The electric transport device of claim 4, wherein the locking mechanism engages the fork in the riding position.

6. The electric transport device of claim 5, wherein the fork comprises a pair of arms extending from the interior space of the casing to the rear wheel, and connecting pins attaching the pair of arms together in the interior space of the casing.

7. The electric transport device of claim 6, wherein the connecting pins engage the rail and slide along the rail during movement of the rear wheel between the riding and stowed positions.

8. The electric transport device of claim 6, wherein the locking mechanism comprises a latch engaging one of the connecting pins to lock the rear wheel in the riding positon.

9. The electric transport device of claim 8, wherein the locking mechanism comprises a lever operatively connected to the latch and moveable to disengage the latch from said one of the connecting pins.

10. The electric transport device of claim 1, where the outer casing defines a slot receiving a portion of the handle, the handle moving in the slot when the rear wheel assembly is moved between the riding and stowed positions.

11. A locking mechanism for an electric transport device, the locking mechanism comprising a latch engaging a rear wheel assembly of the transport device to lock the rear wheel assembly in a riding positon, the locking mechanism being configurable in a first configuration to engage the rear wheel assembly to lock the rear wheel assembly in the riding position, and in a second configuration to disengage the locking mechanism from the rear wheel assembly permitting the rear wheel assembly to be moved relative to an outer casing of the transport device to move the rear wheel assembly from the riding position to a stowed position, the locking mechanism further comprising a lever operatively connected to the latch and moveable to disengage the latch from the rear wheel assembly.

12. The locking mechanism of claim 11, further comprising a linkage connecting the lever to the latch.

13. A method of transitioning a rear wheel assembly of an electric transport device from a riding position to a stowed position, the method comprising:
    operating a locking mechanism to disengage the locking mechanism from the rear wheel assembly when the rear wheel assembly is in the riding positon such that the rear wheel assembly extends rearward of a back of an outer casing of the electric transport device;
    moving the rear wheel assembly relative to the outer casing from the riding position to the stowed position whereby a rear wheel of the rear wheel assembly is at least partially housed in an interior space of the outer casing of the transport device; and
    grasping a handle extending from the outer casing of the transport device to move the rear wheel assembly relative to the outer casing for moving the rear wheel assembly from the riding position to the stowed position.

14. The method of claim 13, further comprising actuating a lever of the locking mechanism to disengage the locking mechanism from the rear wheel assembly.

15. The method of claim 13 further comprising guiding movement of the rear wheel assembly with a guide mounted in the outer casing of the transport device.

16. The method of claim 13, further comprising moving the handle in a slot in the outer casing.

17. The method of claim 13, wherein moving the rear wheel assembly from the riding position to the stowed position comprises moving the rear wheel assembly generally horizontally toward a front of the outer casing.

* * * * *